(12) United States Patent
Seroussi et al.

(10) Patent No.: US 6,836,843 B2
(45) Date of Patent: Dec. 28, 2004

(54) ACCESS CONTROL THROUGH SECURE CHANNEL USING PERSONAL IDENTIFICATION SYSTEM

(75) Inventors: Gadiel Seroussi, Cupertino, CA (US); Kenneth Graham Paterson, Bristol (GB); Wenbo Mao, Bristol (GB); Mark T. Smith, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 395 days.

(21) Appl. No.: 09/896,796

(22) Filed: Jun. 29, 2001

(65) Prior Publication Data

US 2003/0005193 A1 Jan. 2, 2003

(51) Int. Cl.⁷ .............................. H04L 9/32; G08B 23/00
(52) U.S. Cl. .......................... 713/173; 380/29; 380/30; 455/39; 235/380; 340/539.1; 340/572.1
(58) Field of Search ........................ 713/173; 340/539.1, 340/539, 765, 572.1; 455/39, 41; 235/380; 380/29, 30

(56) References Cited

U.S. PATENT DOCUMENTS

| | | | |
|---|---|---|---|
| 4,980,679 A | * 12/1990 | Klaubert | 340/765 |
| 5,130,519 A | * 7/1992 | Bush et al. | 235/380 |
| 5,202,550 A | * 4/1993 | Kocznar et al. | 235/382 |
| 5,382,778 A | * 1/1995 | Takahira et al. | 235/380 |
| 5,621,384 A | * 4/1997 | Crimmins et al. | 340/539 |
| 5,796,827 A | * 8/1998 | Coppersmith et al. | 380/9 |
| 5,960,085 A | * 9/1999 | de la Huerga | 380/25 |
| 6,011,858 A | * 1/2000 | Stock et al. | 382/115 |
| 6,104,913 A | * 8/2000 | McAllister | 455/41 |
| 6,346,886 B1 | * 2/2002 | De La Huerga | 340/573.1 |
| 6,431,455 B1 | * 8/2002 | Ponert | 235/492 |
| 6,441,721 B1 | * 8/2002 | Tajima et al. | 340/286.01 |

FOREIGN PATENT DOCUMENTS

| | | |
|---|---|---|
| DE | 4015482 | 7/1991 |
| DE | 19706494 | 8/1998 |
| EP | 1089 | 4/2001 |

OTHER PUBLICATIONS

Proximity Activated Computer Consol Lock, IBM Technical Disclosure Bulletin, Nov. 1992, issue No. 6, vol. 35, p. 173–176.*

* cited by examiner

*Primary Examiner*—Ayaz Sheikh
*Assistant Examiner*—Taghi T. Arani

(57) ABSTRACT

A security system based on a tamper resistant badge that becomes deactivated if the badge is removed from the person authorized to wear the badge. The badge has a volatile memory for storing the security clearance information associated with the wearer and a processor having sufficient power to perform encrypted communications. The badge also has an attachment sensor that resets the security clearance information if the badge is removed from the wearer. A secure data processing system utilizing the badges includes an administrative computer, A, and a client computer, C. Computer A has an identity verification system for authenticating the identity of individuals having badges and loading the clearance information into the volatile memory after the badge is attached to the wearer. The C computers access the information in the badge's volatile memory to provide access to the wearer at the access level specified in the volatile memory.

19 Claims, 2 Drawing Sheets

ACCESS CONTROL THROUGH SECURE CHANNEL USING PERSONAL IDENTIFICATION SYSTEM

FIELD OF THE INVENTION

The present invention relates to security systems that regulate access to secure areas, and more particularly, to an improved method for providing access based on a key system that is attached to the authorized person.

BACKGROUND OF THE INVENTION

To simplify the following discussion, the present invention will be explained in terms of security systems for use in accessing computers and the like; however, it will be apparent from the following discussion that the present invention may be utilized in other security systems.

Computer systems having access to a network typically utilize some form of access control to assure that unauthorized individuals do not gain access to confidential information or do damage to the network and/or computers connected thereto. The secure access protocols often require a user to memorize multiple passwords and protocols. For example, the user may need a first password to log onto a terminal in the network, a set of different passwords corresponding to the various servers in the networks or secure directories within a server, and yet another set of passwords relating to various software programs and related files.

Electronic identification cards have been used to automate the logon and access control processes. Such systems sense a personal identification presented by the user. The card can be in the form of a radio frequency identification (RFID) card which is sensed remotely by the computer terminal or a card that is passed through a reader by the user.

While such cards can be used to automate the logon process, they do not provide sufficient security to satisfy the needs of many systems. The authenticity of the card can, in principle, be verified by the system that queries the card; however, the system cannot necessarily identify the person presenting the card. An unauthorized person who has gained control of such a card can still access the system.

In principle, the computer terminal can be equipped with hardware that also allows it to authenticate the person presenting the card. In fact, if the person can be identified directly, then an identification card is not needed. Identification systems based on retinal scans, voice prints, and finger prints are well known in the art. This hardware would need to be present at each of the terminals. The cost of providing such hardware at each terminal is often prohibitive.

Even in those situations in which identification hardware is provided at each terminal, the system must still deal with interruptions that occur when the user leaves the terminal for a brief period of time. Consider the case of a user who has logged onto a terminal using some form of personal identification system. If the user leaves the terminal without logging off, an unauthorized user can gain access to the system through the open terminal. Hence, the terminal must have some method for determining that the authorized user remains present at the terminal after the logon. For example, an RFID card worn by the user can be queried periodically to determine that the user is still at the terminal.

If the authorized user breaks contact with the terminal, either because the user left the terminal for a short period of time or because the monitoring system failed to detect the person on one of the periodic queries, the terminal needs to disable itself. When the user again makes contact with the terminal, the logon process must be repeated. A logon process that verifies the identity of the user through fingerprints, retinal scans, etc. requires a relatively long procedure. Hence, such systems are frustrating to use, since a user who turns away from the computer or crosses the room to get a document can be forced to repeat the entire logon protocol.

Broadly, it is the object of the present invention to provide an improved security system.

It is a further object of the present invention to provide a security system that can authenticate a user without requiring expensive personal identification hardware at each work station.

It is a still further object of the present invention to provide a security system that can detect that a user has left the terminal and re-login that user without the need to repeat a lengthy personal identification protocol.

These and other objects of the present invention will become apparent to those skilled in the art from the following detailed description of the invention and the accompanying drawings.

SUMMARY OF THE INVENTION

The present invention is a security system based on a tamper resistant badge that becomes deactivated if the badge is removed from the person authorized to wear the badge. The badge has a data processor with a non-volatile memory, a volatile memory, a transceiver for sending signals generated by the processor and receiving signals specifying operations to be carried out by the badge; and an attachment sensor. The attachment sensor detects the removal of the badge from the person wearing the badge and causes information stored in the volatile memory to be rendered unreadable when the attachment sensor detects the removal. The information stored in the volatile memory stores information that determines the security clearance associated with the person wearing the badge. The badge may also include a tamper sensor for detecting unauthorized alterations in the badge, such as opening the badge. The tamper sensor likewise renders data in the badge unreadable upon detecting such an alteration. The badge may include a random number generator that includes a sensor for sensing an environmental variable that is used to generate an unpredictable random number sequence. The random numbers generated by this generator can be utilized in providing a secure communication channel between the badge and various computers in a data processing system. In one embodiment of a badge according to the present invention, the badge has a low power mode in which the badge monitors the transceiver for incoming signals while curtailing other activities that would utilize power until a predetermined incoming signal is detected.

A secure data processing system utilizing the badges of the present invention includes an administrative computer, A, and a client computer, C. An authorized individual is given access to C by being provided a badge according to the present invention that is secured to that individual. Computer A has a transceiver for communicating with the badge and an identity verification system for authenticating the identity of individuals having badges attached thereto. Computer A loads information in the volatile memory of the badge attached to that individual in response to the identity verification system authenticating that individual. The information specifies the level of access to the computer system to which that authorized individual is entitled. The information is preferably loaded over a secure communication channel that is established between A and the badge utilizing data encryption based on a public key encryption system. Once the access data is loaded into the badge, any attempt to remove the badge or tamper with the badge leads to the loss of the access information and renders the badge incapable of providing access to C. The C computers and the badges establish a preferably secure communication channel when a person wearing a badge approaches a C computer. The C computer and the badge then authenticate one another prior to the C computer being given access to the information in the badge's volatile memory. The C computer then provides access to the person wearing the badge at the access level specified in the volatile memory. During the time the badge wearer is accessing information through the C computer, C periodically verifies the presence of the badge by sending, and receiving, coded transactions to, and from, the badge.

DETAILED DESCRIPTION OF THE INVENTION

Figure 1:
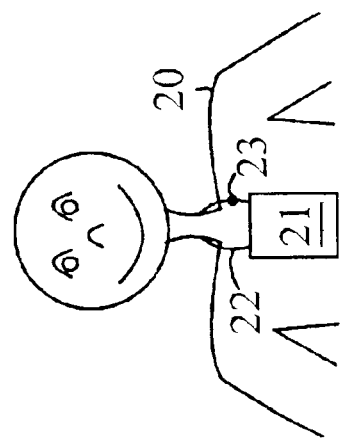
FIG. 1 is a schematic drawing of a system for securing access to a computer system having a number of terminals.
Figure 1:
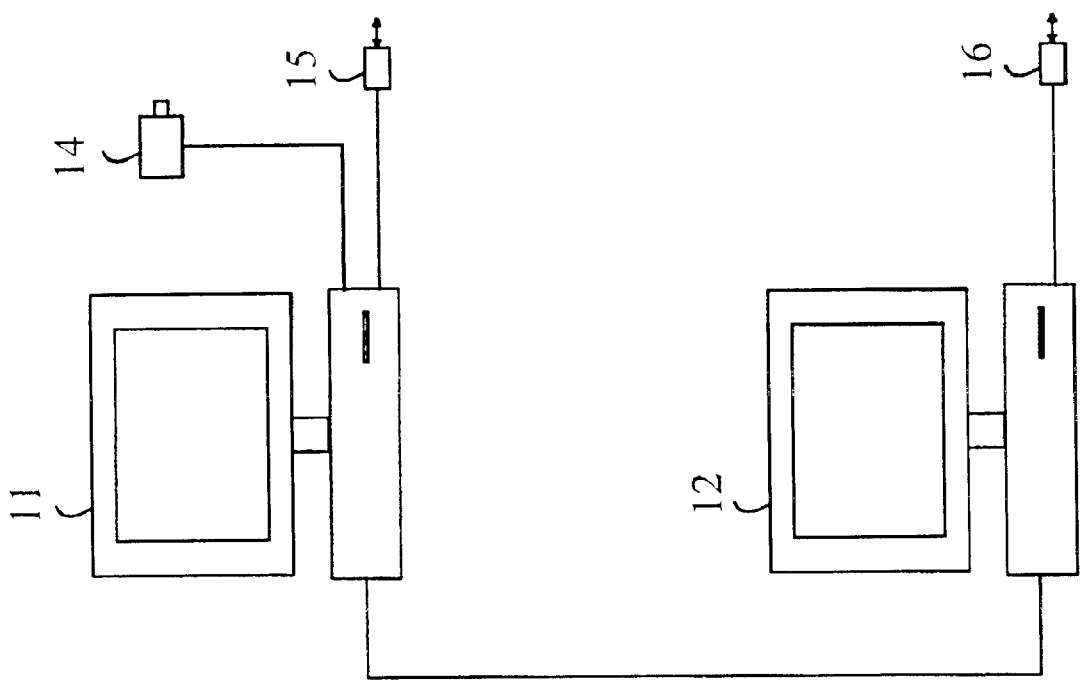

The manner in which the present invention provides its advantages may be more easily understood with reference to FIG. 1, which is a schematic drawing of a system for securing access to a computer system having terminals shown at 11–and 12. Access to the system is provided by a badge 21 that is worn by a user 20 who wishes to gain access. Badge 21 is affixed to the user in a manner in which the removal of badge 21 after it has been affixed can be detected by the badge. For example, badge 21 can be placed around the neck of user 20 via a cord 22 that includes a clasp 23. Cord 22 is short enough to guarantee that the badge cannot be removed from the neck of the wearer without undoing clasp 23 or breaking cord 22. Badge 21 has a sensor that detects the opening of clasp 23 or the breakage of cord 22. For example, cord 22 may include a conducting fiber whose continuity is sensed by badge 21. When clasp 23 is opened, this conductive path is broken.

To gain access to the computer system, user 20 puts on badge 21 and approaches terminal 11, which loads the information into badge 21 needed for the user to access one or more of the other workstations in the network. Terminal 11 includes a user identification system 14 that is utilized to verify the identity of user 20. Identification system 14 may include physical sensors such as those needed to make a voice print, retinal scan, or fingerprint scan. The identification system may also include a database having information known only to user 20, which may be utilized in generating queries that only user 20 would know how to answer.

Once the identity of user 20 has been established by terminal 11, terminal 11 loads information into badge 21 that is utilized by badge 21 in subsequent communications with the other terminals in the system. To simplify the following discussion, it will be assumed that the various terminals communicate with badge 21 via infra-red signals that are sent and received by the transceivers shown at 15–16. As will be explained in more detail below, this information is loaded using an encryption system that assures that an eavesdropper cannot gain access to the stored information in a manner that would allow the eavesdropper to communicate with the various terminals in the system.

In addition to loading the various clearances associated with user 20, a "day secret" is also loaded in badge 21. The day secret is a code that changes each day and is known to all of the workstations. Since the code changes from day to day, the permissions granted to user 21, in effect, expire each day.

Once badge 21 has been loaded with the various security clearances assigned to user 20, user 20 can approach the terminals that are authorized to serve user 20 such as terminal 12 and gain access thereto. Each terminal includes a transceiver that queries the identification badges. When a terminal detects a valid badge that has permission to use that terminal, the terminal allows the user to log onto the terminal and communicates the user's various clearances to the servers within the system.

The terminal in question periodically queries badge 21 to assure that the user is still at the terminal. If the terminal loses contact with the badge, the terminal covers any material on the display with a "screen saver" display and enters a first locked mode. During this mode, the terminal periodically sends out query signals. If the badge returns, the terminal utilizes an abbreviated logon dialog to verify the user and returns the display to the condition at the time communication was originally lost.

If the user is absent for more than a first predetermined time period, the terminal enters a second locked mode which requires a more extensive logon protocol to return control to the user. The reason for these two different locked modes will be explained in more detail below. If the user is absent for more than a second predetermined time period, the terminal logs the user off of the system.

Figure 2:
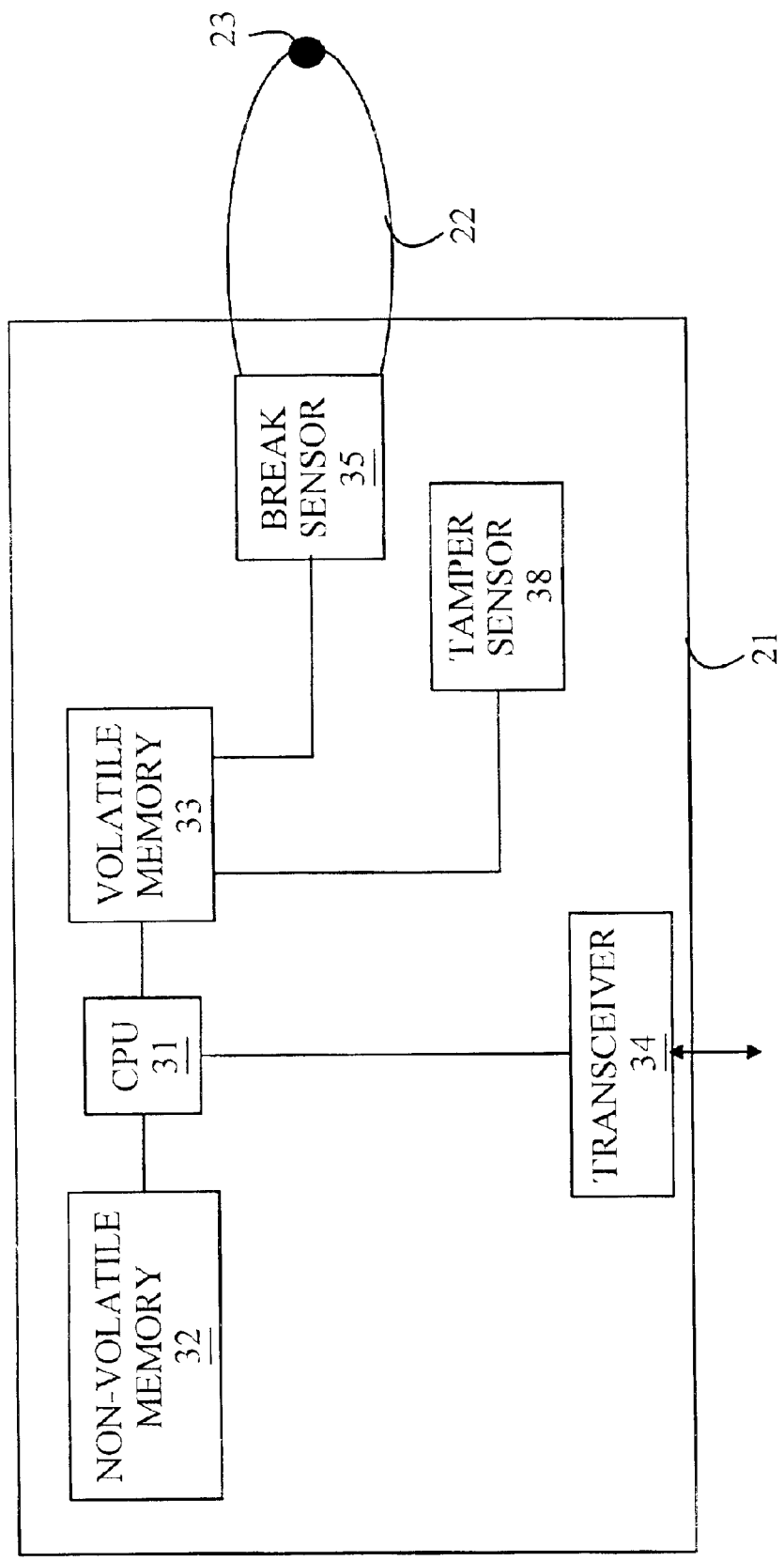
FIG. 2 is a block diagram of one embodiment of a badge 21 according to the present invention.

Having provided the above outline of the operation of a security system according to the present invention, a more detailed description of the operation of the badges and the communication protocols will now be given. Refer now to FIG. 2, which is a block diagram of one embodiment of a badge 21 according to the present invention. Badge 21 includes a processor 31 that includes a non-volatile memory 32 used to store the operating system utilized by the processor. Badge 21 also includes a user certificate volatile memory 33 that is used to store the "permissions" granted to the user and other information needed to gain and maintain access to a terminal. Badge 21 is also assumed to hold an identification number that is stored in the non-volatile memory of the badge.

Badge 21 utilizes a transceiver 34 to communicate with the various computer terminals. Transceiver 34 may utilize any form of communication link to communicate with the computer terminals in the system. In the preferred embodiment of the present invention, transceiver 34 utilizes an infra-red link; however, communication links based on radio frequency signals or ultra-sound may also be utilized. Infra-red or RF links are preferred because they impose the lowest power requirements on badge 21 which is typically powered by a battery.

In addition, badge 21 has a sensor 35 that detects a break in the continuity of cord 22. Whenever sensor 35 detects a break in cord 22, the contents of memory 33 are erased by processor 31. Similarly, if power is lost, the contents of memory 33 are lost. Badge 21 can also be equipped with other forms of "tamper" sensors, such as sensor 38, that cause the contents of memory 33 to be lost if someone attempts to open the badge or otherwise gain access to the contents of ID memory 33. Hence, badge 21 is automatically reset whenever it is removed, loses power, or subjected to tampering.

The affixation of the badge to the user prior to the badge being loaded by terminal 11 can be verified by security personnel stationed at a point that all users must pass before reaching terminal 11. Such verification prevents a user from closing clasp 23 when the badge is not affixed to the user and then presenting himself and the badge to terminal 11 for loading.

As noted above, the communications between the various terminals and badge 21 must be secure from eavesdropping. Data encryption protocols for securing such communications are well known to those skilled in the art, and hence, will not be discussed in detail here. For the purposes of this discussion, it will be assumed that terminal 11 and each badge have a protocol that allows terminal 11 and each badge to generate a "secret", denoted by "k" that is known only to terminal 11 and the particular badge in question. For example, the elliptic curve version of the Diffie-Hellman protocol may be utilized to generate such a secret. The reader is directed to Handbook of Applied Cryptography by Menezes, van Oorschot, and Vanstone (CRC Press, 1997, and to Elliptic Curves in Cryptography by Blake, Seroussi, and Smart, Cambridge University Press, 2000) for a more detailed discussion of various cryptographic algorithms.

As noted above, the identification badges of the present invention are preferably powered by batteries. Alternatively, a badge according to the present invention can be powered off of the incoming light, RF, or acoustical signals from the computer terminal that interacts with the badge. In either case, power is at a premium, and hence, the computational speed of the processors in the badges is extremely limited. Security protocols, such as the Diffie-Hellman protocol are computationally intensive, and hence, the logon process and subsequent data transfers between badge 21 and the user terminals can require several seconds or even a minute. While one-time delays of this magnitude are acceptable when a user first loads the identification badge or uses the badge to log onto a terminal, repeated delays of this magnitude that would occur each time communication is broken between a badge and a terminal are unacceptable.

The preferred embodiment of the present invention avoids these delays by using a second, less computationally intensive, algorithm for verifying the presence of the user at the terminal once the user has been authenticated using the more secure code system. This protocol can be preformed in a much faster manner by the level of processor in the badge, and hence, the unacceptable delays discussed above are avoided.

Having outlined the manner in which information is exchanged between the terminals and the badge, a more detailed explanation of the preferred communication protocols will now be provided. To simplify the following discussion, the communication protocols will be explained with reference to specific encryption procedures and computer arrangements; however, other coding systems may be utilized without departing from the teachings of the present invention.

Consider a hospital setting in which controlled access to confidential records such as patient treatment records is to be provided to the clinicians while protecting the confidentiality of those records. Each clinician wears a badge similar to those described above. The badge is filled with the clinician's identity information, denoted by Cred, in the following discussion. This information is stored in the volatile memory of the badge as discussed above. In particular, the badge will automatically erase Cred and become inactive as soon as the badge is detached from the clinician to which it is assigned.

The badge is activated by the action of physically attaching the badge to a clinician and running an authentication protocol between the badge and an administrative computer such as terminal 11 discussed above. During the activation protocol, the administrative computer will verify the clinician's identity by scanning the clinician's retina. At the end of the authentication protocol, the badge will be loaded with Cred and thereby activated.

While being active (i.e., remaining worn by the clinician), the badge will be able to establish secure sessions of communications with one or more of the clinician's computers (denoted C) whenever the clinician faces the computer and is within the range of an infra-red communication link constructed from ports on C and the badge. These secure sessions of communications between the badge and C are part of a second protocol, referred to as the "records" protocol.

As noted above, the badge power supply is very limited; hence, the system is preferably setup in a manner that minimizes the demands on the badge power supply. In addition to performing the various protocols discussed below, the badge must be able to detect the presence of the administrative computer and C computers. In addition, the badge must be capable of signaling its continued presence to these computers during interactions with them. In the preferred embodiment of the present invention, the badge has a "dormant" state in which the badge listens for signals on the communication link and "wakes up" when a signal that needs a response is detected. With the exception of this listening activity and other housekeeping functions such as providing power to the volatile memory and tamper detection circuitry, the other power consuming functions of the badge are turned off in the dormant state.

The badge enters the dormant state after it is attached to the user. The administrative computer is programmed such that its transceiver sends out a periodic login signal indicating that it is ready to activate a badge. This login signal is one of the signals that the badge is programmed to detect in the dormant state. When the wearer approaches the computer, her badge detects this login signal and wakes up for the activation protocol in which the badge is loaded with Cred and activated such that the wearer can log onto a C computer. Once the activation protocol is completed, the badge again returns to the dormant state.

Each of the C computers likewise sends out a periodic login signal when that computer is free and ready to login a new user. This second login signal is also one of the signals detected by the badge in the dormant state. When the badge wearer approaches the C computer, the badge detects the login signal and switches from the dormant state to engage in the login protocol discussed below.

At the end of the C computer login protocol, the C computer transceiver is programmed to send a third signal that is recognized by the badge in the dormant state. This signal is used to verify that the user is still at the terminal. The badge is programmed to respond to this signal by sending a specific acknowledgement signal in return. This communication can be part of the dormant state operations or part of a second low power state.

If a badge does not acknowledge the verification signal described above, the C computer initiates a re-login procedure by sending a fourth signal that is recognized by the badge in the dormant or low power state. This signal is repeated until the badge responds accordingly or a predetermined period of time elapses. If the badge responds according to the protocol discussed below, the C computer resumes the verification signal. If the badge does not respond appropriately, the user is logged off of the terminal, and the C computer enters the mode in which it sends the C computer login signal.

The protocols used in the preferred embodiment of the present invention are based on the following assumptions. First, the badge has a good physically based random number source whose sequence cannot be predicted. The badge is capable of performing the less computationally intensive public-key encryption operations such as elliptic-curve point multiplication and generating the hash function SHA-1 utilized in the Secure Hash Standard as published in the Federal Register.

Second the administrative computer is at a physically secured location (e.g., at the entrance of the clinic). The C computers are workstations in private rooms that are not secure in that a C computer could be replaced by a fake without being detected by security personnel. The administrative computer and the C computers are connected by a network that allows the administrative computer and the C computers to share a security domain that links A and C's and allows A to share a "day secret", denoted by DS, via a secure means. Conventional network operating systems provide this type of security; hence, this aspect of the present invention will not be discussed further here. If there are multiple copies of the administration computer in the security domain, then these administrative computers would agree on a DS before propagating it to the C's.

Third, in the authentication protocol carried out between the administrative computer and the badges, the administrative computer does not need to authenticate itself to B, since the administrative computer is assumed to be secure, and hence, the administrative computer could not have been replaced by another computer. This assumption reduces the computing load on the badge which has limited processing power for authenticating the administrative computer (e.g., via verifying a certificate and signature of the administrative computer). However, the badge always needs to authenticate itself to the administrative computer and the C computers. In addition, each C computer must authenticate itself to the badge since a C computer may be a workstation in a clinician's private room and may easily be replaced with a fake.

Finally, the system does not try to prevent attacks launched by a corrupt clinician who wishes to disclose medical records in a unauthorized way. Such a clinician can steal medical records for unlawful use in the current medical record systems.

Each badge has a public "username", denoted by ID. A corresponding private "password", denoted by PWD, is stored in the badge's non-volatile memory. In the preferred embodiment of the present invention, ID=SHA-1(PWD), where SHA-1 denotes a secure hash function. It is assumed that PWD is large enough to render a dictionary attack aimed at searching all possible PWDs to generate ID impractical.

Both the administrative and C computers have a "Badge file" which contains a list of the IDs of authorized badges.

During the authentication protocol, a key, denoted by "KEY", is defined as described below. Subsequent encrypted communications based on that key are performed as follows. The message, M, to be encrypted is broken into fixed length blocks, $M_I$, for I=0, 1, . . . The number of bits in each block is determined by the size of the key. The bits of block $M_I$ are XORed with those of an encryption sequence, $K_I$, of the same size, where $K_I$=SHA-1(KEY+I). The resulting bit stream will be denoted by E(KEY, M). A party knowing KEY can decode E(KEY, M) by generating the same sequence of SHA-1 computations, and applying the same sequence of XOR operations.

The manner in which KEY is derived by both the badge and the computers will now be explained in more detail. The same procedure is utilized between the C computers and the badge as between the administrative computer and the badge. Both the badge and the various computers store parameters specifying an elliptic curve and arithmetic operations based on that curve. The key generation protocol begins with the Badge generating a random number "n" and sending the number, unencrypted to the recipient computer, X, which can either be the administrative computer, denoted by A in the following discussion, or computer C.

Badge→>X: (n)

This is mainly to signal "I am here" if X=A, but when X=C, it is treated as a challenge. Next, X responds by sending an unencoded sequence back to the badge as follows:

X→>Badge:
 (P, [a] P) if X=A
 (P, [a] P, SHA-1(DS, n, [a]P) if X=C, where, SHA-1(S1, S2, . . . , SN) denotes SHA-1 applied to the concatenation of strings S1, S2, . . . , SN, for any positive number of strings, and P is a random base point on the elliptic curve. Here, "a" is a random number generated by X and [a]P denotes the point on the elliptic curve corresponding to [a] times the point P as defined in conventional elliptic Diffie-Hellman encryption algorithms. Next, B generates a random number, b, and computes the key, KEY=x([b][a]P), where x(Q) denotes the x coordinate of the point Q.

If X=C, then the badge also checks whether the correct value for SHA-1(DS, n, [a]P) has been sent back in the second phase. It should be noted that the badge had DS downloaded from A when it was activated. If the correct value is not received, the badge signals an error to the clinician and aborts the protocol. If everything is correct then the badge transmits the sequence ([b]P, ID, T=E(KEY, PWD). It should be noted that the badge knows KEY at this point, since after receiving [a] P, and having generated b, the badge computed KEY=[b] [a] P. After the badge's transmission, X can also generate the key, and decode T=E (KEY, . . .), since [b] P precedes T in the transmission, in the preferred embodiment of the present invention, X also verifies the validity of ID, and that PWD matches ID, using a table of IDs and their corresponding passwords.

When X is the administration computer A, the key generation procedure is performed after the administration computer has verified the identity of the clinician and determined the credentials associated with that clinician. Once A has verified this information and A and the Badge have agreed on KEY, A sends the sequences E(KEY+1), Cred) and E(KEY+2, DS) to the badge. The badge then decodes Cred and DS and stores them in the badge's volatile memory. The badge is activated at this point.

When a clinician having an activated badge approaches one of the C computers, the badge and the C computer agree on a key, KEY', using the protocol discussed above. B then sends its Cred to C in the sequence E(KEY'+1, Cred). Computer C decrypts this sequence and obtains Cred; if it is valid, it then gives the clinician access.

As noted above, the badge and C also need a quick way of performing a challenge-response if the link between the clinician's badge and C is interrupted because the clinician moved away from the screen or turned her chair so that the infra-red link was lost. The following algorithm provides such a challenge-response mechanism that can be accomplished in an acceptable time given the computational limitations of the badge.

When a badge, B, completes its login exchange with C, B executes the following sequence:

Set i=1

$r_0$=KEY'+2

B generates a random number $r_1$.

B send to C the message SHA-1($r_1$, $r_0$).

C receives the message, initializes a counter j=1, and computes $r_0$=KEY'+2. C then sends an acknowledgement message, Ack, to B. Once B receives Ack, login is complete from both C and B's point of view.

C and B then enter a connection sensing mode in which C sends a challenge signal and B responds. The challenge-response can be simple non-encrypted signals to save power. If C does not detect a response to one of its challenges within a predetermined period of time, C sends a second challenge signal repeatedly until either C receives an appropriate response as discussed below or a predetermined time has elapsed. If the time period elapses, C logs the clinician off of the terminal and enters its ready mode in which it waits for a login request from a badge.

If B detects one of the second challenge signals, B executes the following sequence:

B increments i, i.e, i=i+1

B generates a random number $r_i$

B sends to C the message (r_{i-1}, SHA-1($r_i$, $r_0$)).

If B receives an acknowledgement of this message, it goes back into its connection sensing mode. If B receives another second challenge signal, it repeats the message.

Having issued the second challenge signal, C listens for the response from B. If j=1, C executes the following sequence on receipt of a message from C:

$r_0$=KEY'+2 receive Sha-1($r_1$, $r_0$)

increment j.

acknowledges receipt of the message and stores the message.

If j=2, C receives ($r_1$, SHA-1 ($r_2$, $r_0$)), and checks whether the message from the last step was actually equal to SHA-1($r_1$, $r_0$). If it was, it acknowledges the message, stores the newly received message, and returns to the connection-sensing mode.

If j>2, C executes the following algorithm increment j, i.e., j=j+1 receive (r_{i-1}, SHA-1($r_i$, $r_0$))

C checks whether the second part of the message in round j-1, is equal to SHA-1(r_{i-1 }, $r_0$). If the message is correct, C sends an acknowledgement to B, stores the newly received message, and returns to the connection mode. It should be noted that the sequence of i and j values remain synchronized, since the badge does not increment i unless it receives an acknowledgment from C, and C does not increment j unless it has sent such an acknowledgment to the badge While the above examples utilize specific communication protocols and encryption techniques, it will be obvious to those skilled in the art from the preceding discussion that other protocols and encryption techniques can be utilized. In general, the present invention requires that the badge and wearer are authenticated by the administrative computer and that the badge is attached to the wearer by a tamper-sensing mechanism that allows detachment to be detected. Once these elements are authenticated, the administrative computer loads the badge with the credentials of the wearer, and any subsequent tampering erases the loaded information.

The level of security needed in the interchange between the administrative computer and the badge wearer depends on the level of security surrounding the administrative computer and the degree of honesty of the badge wearer. For example, if the badge wearer can be assumed to be honest, then the system does not need to guard against the wearer recording the exchange. This leaves only the possibility that a third party will eavesdrop on the exchange between the badge and the and the terminal. If the administrative computer is in a location that is secured with respect to such eavesdropping, the exchange need not be encrypted at all.

If, on the other hand, the badge wearer cannot be trusted, then an encryption protocol that is immune from eavesdropping must be utilized. In this case, any suitable public or private key encryption system may be used by the computers and the badges to develop a key for later use in encrypting messages. If a private key system is utilized, the system must be arranged in a manner that guarantees that the key cannot be extracted from the badge. For example, the badge can include tamper sensors that erase the key information if tampering is detected.

Similarly, the level of security needed in the exchanges between the C computers and the badge depend on the value of the information and the trustworthiness of the wearer. In general, the badge and the C computer must authenticate each other, since it is assumed that the C computers are not secure. If, however, the C computers are secure, then only the badge needs to be authenticated by the C computer. The level of security needed to assure privacy with respect to the communications between the badge and the C computer again depends on the ease with which these communications can be monitored. If there is a possibility of eavesdropping, then a suitable public or private key encryption system must be utilized in the authentication exchange. Similarly, the secondary protocol utilized at the C computers to re-establish a lost link with a badge can be replaced by any suitably secure protocol that is less computationally intensive than the login protocol used to commence the session between a badge wearer and C.

As noted above, the system can utilize any type of transceiver to generate the communication link between the badge and the relevant computer terminals. Infra-red sensors are preferred, however, because such sensors require relatively low power and provide increased security over other types of communication links such as RF links. An eavesdropper can monitor an RF signal from a location outside of the cubical or room in which the badge and terminal are operating. In contrast, light-based systems require the eavesdropper to have a clear line of sight to both the terminal and badge transceivers.

The above-described embodiments of the present invention utilized a day secret DS to further secure the system. However, any code that is periodically changed at intervals sufficient to render knowledge of that code useless can be utilized for this function.

The above-described embodiments of the present invention utilized a sensor in an attachment cord to detect the removal of the badge from the person's body. However, it will be obvious to those skilled in the art from the preceding discussion that other forms of sensing can be utilized for this function. For example, the badge can utilize some form of biometric measurement to assure that the badge is still on the authorized individual's body. Sensor's that detect body heat or pulse can be utilized for this function.

It should be noted that the badges of the present invention are not permanently associated with particular individuals, and hence, an employee does not need to take his or her badge home. The badges can be picked up from a big basket near station A when needed and thrown back to the basket at the end of the day. Hence, the costs and inconvenience associated with losing or damaging a badge are significantly reduced.

Various modifications to the present invention will become apparent to those skilled in the art from the foregoing description and accompanying drawings. Accordingly, the present invention is to be limited solely by the scope of the following claims.

What is claimed is:

1. A method for operating a computer security system comprising: providing a badge to an individual, the badge comprising:
   a non-volatile memory; and
   an attachment sensor for detecting the removal of said badge from an individual, said attachment sensor causing information stored in said volatile memory to be rendered unreadable when said attachment sensor detects said removal;
   determining whether the individual possessing the badge belongs to a set of authorized individuals, said determining comprising evaluating the individual, separate from the badge, using an identity verification system; and
   in response to said identity verification system determining the individual belongs to the set of authorized individual, subsequently causing an administrative device to load information into said volatile memory of said badge, said information specifying the level of access to said computer system to which the individual is entitled.

2. The method of claim 1 wherein said causing the administrative device to load information comprises:
   establishing a secure communication channel between the administrative device and that badge by encrypting signals sent and received by said transceivers in the administrative device and that badge; and
   sending said information on said secure communication channel.

3. The method of claim 1 wherein said identity verification system compares the retina of the individual with data derived from a previous measurement on the individual's retina.

4. The method of claim 1 wherein said information loaded by the administrative device into the badge includes code that is periodically changed.

5. A security badge comprising:
   a non-volatile memory;
   a volatile memory;
   a transceiver for sending and receiving signals utilized by said badge; and
   an attachment sensor for detecting the removal of said badge from an individual, said attachment sensor causing information stored in said volatile memory to be rendered unreadable when said attachment sensor detects said removal;
   wherein an administrative device may load information in said volatile memory of said badge in response to and subsequent to an identity verification system authenticating an individual maintaining said badge as belongsing to a set of authorized individuals, said information specifying the level of access to a client computer to which the individual is entitled.

6. The security badge of claim 5 wherein said information loaded by the administrative device into the badge includes a code that is periodically changed.

7. The method security badge of claim 5 wherein the administrative device loading information comprises:
   establishing a secure communication channel between the administrative device and that badge by encrypting signals sent and received by said transceiver in the badge; and
   sending said information on said secure communication channel.

8. A method for operating a computer system comprising an administrative computer, said method comprising:
   providing a badge to an individual, said badge having a volatile memory, a transceiver for sending and receiving signals, and an attachment sensor for detecting the removal of said badge from that individual, said attachment sensor causing information stored in said volatile memory to be rendered unreadable when said attachment sensor detects said removal;
   providing the administrative computer with a transceiver for communicating with the badge and an identity verification system for determining whether the individual, distinct from the badge, belongs to a set of authorized individuals; and
   upon determining that the individual possessing the badge personally belongs to the set of authorized individuals, subsequently causing the administrative computer to load information in said volatile memory of said badge, said information specifying the level of access to said computer system to which the individual is entitled.

9. The method of claim 8 wherein said subsequently causing the administrative computer to load information comprises:
   establishing a secure communication channel between the administrative computer and the badge by encrypting signals sent and received by said transceivers in the administrative computer and that badge; and
   sending said information on said secure communication channel.

10. The method of claim 8 wherein said identity verification system compares the retina of the individual with data derived from a previous measurement on the individual's retina.

11. The method of claim 8 wherein said identity verification system compares a finger print of the individual with data derived from a previous measurement on the individual's finger print.

12. The method of claim 8 wherein said identity verification system compares the voice of the individual with data derived from a previous measurement on the individual's voice.

13. The method of claim 8 wherein said identity verification system compares answers to queries posited to the individual with data previously provided by the individual.

14. The method claim 8, wherein said computer system further comprises a client computer, the method further comprising:
   providing the client computer with a transceiver for communicating with the badge possessed by the individual;
   causing the client computer to verify authenticity of the badge separate from the individual by receiving data derived from the data stored in said volatile memory of the badge by the administrative computer; and causing the client computer to provide the individual with access to said computer system, where level of access depends on the data stored in the badge.

15. The method of claim 14, wherein said computer system further comprises a client computer, and wherein the client computer periodically verifies presence of the individual by sending to and receiving signals from the badge.

16. The method of claim 15, wherein the client computer utilizes a first secure code to exchange data with the badge when verifying the authenticity of the badge.

17. The method of claim 16, wherein the client computer utilizes a second secure code to verify the presence of that individual, said second secure code requiring less computational resources than said first secure code.

18. The method of claim 17, wherein said second secure code depends on said first secure code and changes each time the client computer verifies the presence of the individual.

19. The method of claim 18, wherein said information loaded by the administrative computer into the badge includes a code that is periodically changed.

* * * * *